UNITED STATES PATENT OFFICE.

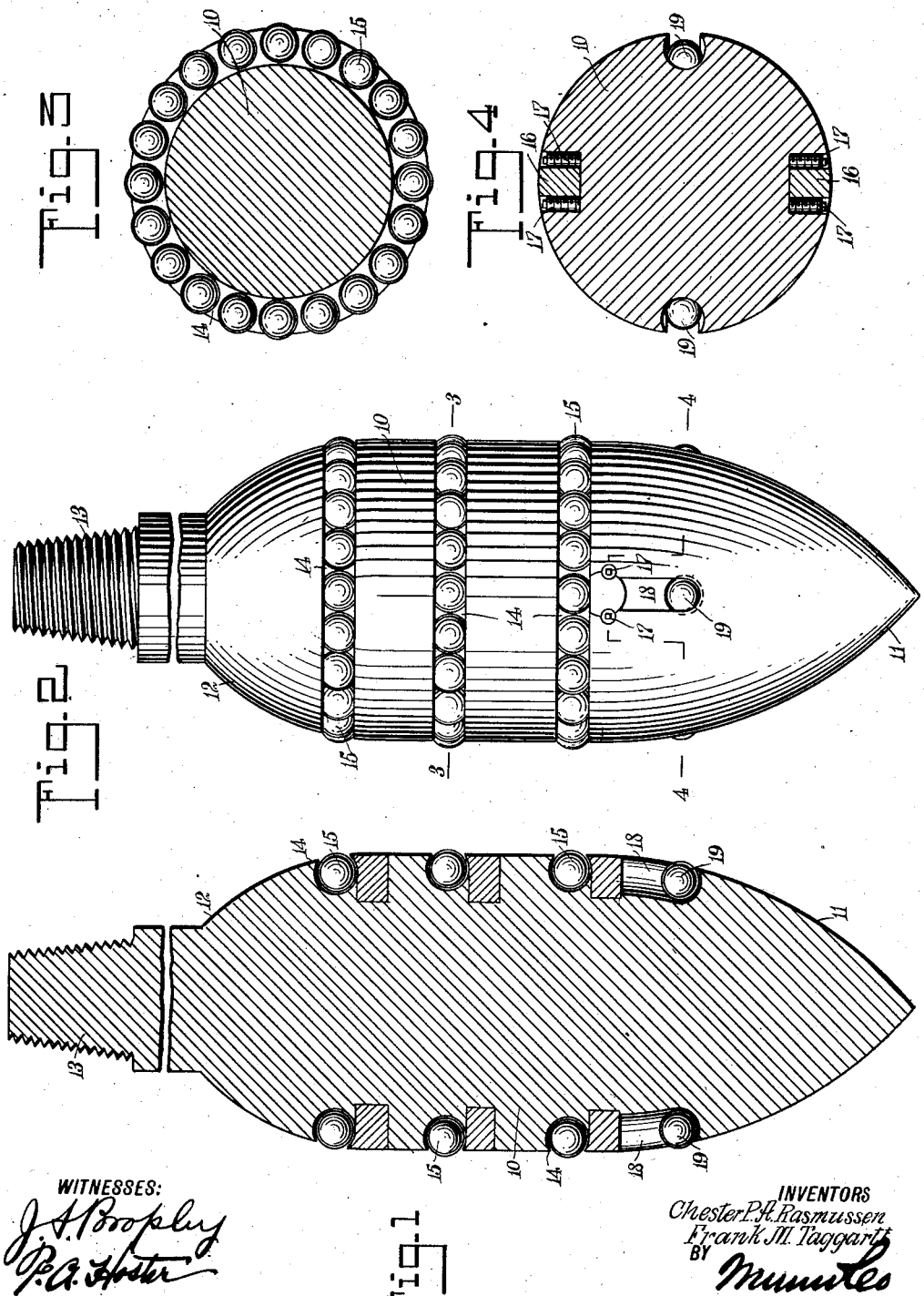

CHESTER PETER ADOLPH RASMUSSEN AND FRANK MUIRHEAD TAGGARTT, OF COALINGA, CALIFORNIA.

SWAGE.

1,010,954.  Specification of Letters Patent.  Patented Dec. 5, 1911.

Application filed April 20, 1910. Serial No. 556,580.

*To all whom it may concern:*

Be it known that we, CHESTER P. A. RASMUSSEN and FRANK M. TAGGARTT, citizens of the United States, and residents of Coalinga, in the county of Fresno and State of California, have invented a new and Improved Swage, of which the following is a full, clear, and exact description.

An object of the invention is to provide a device for use in driven wells, to expand the casings of the same.

For the purpose mentioned, use is made of a tapered body having ball bearings thereon, to reduce any friction between the body and the casing when the swage is forced into the casing, and also to permit of more easily forcing the swage into the casing.

Reference is to be had to the accompanying drawings forming a part of this specification, in which similar characters of reference denote corresponding parts in all the views, and in which—

Figure 1 is a sectional side view of our device; Fig. 2 is a side elevation showing the ball bearings; Fig. 3 is a sectional view, taken on the line 3—3 in Fig. 2; and Fig. 4 is a sectional view taken on the line 4—4 in Fig. 2.

In driven wells, particularly oil wells, the casings are often dented or bent out of proper alinement by shocks or jars from explosions and the like, and it is for the purpose of re-alining these casings that our swage is provided. The common method of swaging a well is to force the swage into the casing to expand those portions thereof that have collapsed or are dented, as mentioned heretofore, and the instrument most generally used is a swage formed of a solid, heavy material and provided with tapering ends. Consequently when the swage engages the casing, great friction is created and often trouble is experienced in forcing the swage into the casing. Furthermore, the wear and tear on the casing are undeniably large.

Now in our device we provide a ball bearing swage, so constructed and arranged that the friction between the casing and the swage is greatly reduced when the swage is forced into the casing, and the operation of forcing the swage into the casing is made simple and easy.

Referring more particularly to the various views, a swage 10 is provided having tapering ends 11 and 12, with a screw-threaded portion 13 on the end 12 for engagement with a handle for forcing the swage into a casing. On the peripheral surface of the swage 10 a series of similar grooves 14 are shown, and adapted to contain therein rows of ball bearings 15 as will be easily seen by referring to Fig. 2. Below the rows of ball bearings 15 and on the tapering end 11, opposite similar pins 16 are disposed, and are removably held in the swage 10 by screws 17. Beneath and arranged as continuations of the hole provided for the pins 16, are slots 18 having slidably mounted therein bearings 19. Now by removing either or both of the pins 16, it will be readily seen that the balls 15 in the lowest groove 14 can be removed from the groove 14 by way of the opening made when the pins 16 are removed, and access is also gained to the balls 19 in the slots 18. In this manner the ball bearings at the lower end of the swage 10 can be quickly removed at any time.

As shown in Figs. 1 and 2, the bolts in the upper grooves are permanently mounted thereon, but it will be understood that the same means for removing the balls from the lower groove, as has been heretofore described, can also be applied to the upper grooves.

When the swage is forced into a casing, the balls 19 tend to move upwardly in the slots 18, and owing to the turning movement of ball bearings, the friction between the swage and the casing is greatly reduced, and when the swage is removed from the casing the balls 19 return to the position shown in Figs. 1 and 2. Furthermore, as the swage engages a dent in the casing the balls on the swage tend to gradually expand the casing at this point and obliterate the dent.

Although we have shown the ball bearings of our swage as disposed in rows at right angles to the longitudinal axis of the swage, it will be distinctly understood that the ball bearings can be mounted spirally on the peripheral surface of the swage, or in any particular manner desirable to the operation of the swage, provided we do not depart from the spirit of our invention, and it will be further understood that the scope of our invention is defined in the appended claims.

Having thus described our invention, we claim as new and desire to secure by Letters Patent:

1. A swage comprising a body portion provided with annular grooves, balls disposed therein, portions of the balls projecting beyond the outer surface of the said body portion, and means whereby the balls may be removed therefrom.

2. A swage comprising a body portion provided with a plurality of grooves, ball bearings disposed therein, and slotted means on the swage whereby the ball bearings may be removed from the grooves.

3. A swage comprising a body portion provided with grooves, ball bearings disposed in the grooves and projecting beyond the outer periphery of the swage, and means whereby the ball bearings may be removed therefrom.

In testimony whereof we have signed our names to this specification in the presence of two subscribing witnesses.

CHESTER PETER ADOLPH RASMUSSEN.
FRANK MUIRHEAD TAGGARTT.

Witnesses:
R. C. PALMER,
LEROY AKEN.

Copies of this patent may be obtained for five cents each, by addressing the "Commissioner of Patents, Washington, D. C."